(12) United States Patent
Yoshida

(10) Patent No.: US 7,620,312 B2
(45) Date of Patent: Nov. 17, 2009

(54) FOCUS DETECTION APPARATUS AND SIGNAL PROCESSING METHOD FOR FOCUS DETECTION

(75) Inventor: Tomokazu Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 11/400,397

(22) Filed: Apr. 6, 2006

(65) Prior Publication Data

US 2006/0228098 A1    Oct. 12, 2006

(30) Foreign Application Priority Data

Apr. 11, 2005    (JP) .............................. 2005-113957

(51) Int. Cl.
*G03B 3/00* (2006.01)
*H04N 5/335* (2006.01)
*G02B 7/04* (2006.01)
*G02B 27/40* (2006.01)

(52) U.S. Cl. ...................... 396/128; 396/99; 348/230.1; 348/298; 250/201.7; 250/201.8

(58) Field of Classification Search ................. 396/128, 396/99, 111, 113, 114, 115, 121–123; 348/298, 348/340; 250/201.7, 201.8, 202, 201.9
See application file for complete search history.

(56) References Cited

U.S. PATENT DOCUMENTS

| 5,008,698 | A | * | 4/1991 | Muramatsu et al. ......... 396/234 |
| 5,192,860 | A | | 3/1993 | Shinohara et al. |
| 5,597,999 | A | | 1/1997 | Kinba et al. |
| 6,711,350 | B2 | | 3/2004 | Yoshida et al. |
| 6,819,360 | B1 | | 11/2004 | Ide et al. |
| 2002/0044700 | A1 | | 4/2002 | Yukawa et al. |
| 2002/0044779 | A1 | * | 4/2002 | Shiomi et al. ............... 396/429 |

FOREIGN PATENT DOCUMENTS

| CN | 1847905 | 10/2006 |
| DE | 3406578 | 8/1984 |
| EP | 1 460 839 | 9/2004 |
| JP | 63-148215 | 6/1988 |
| JP | 08-275009 | 10/1996 |
| JP | 08-275019 | 10/1996 |
| JP | 08-275023 | 10/1996 |
| JP | 08-275027 | 10/1996 |
| JP | 08-275034 | 10/1996 |

(Continued)

OTHER PUBLICATIONS

Communication concerning Appln 06112329.5-2202, including Partial European Search Report dated Nov. 6, 2007.
Communication from European Patent Office dated Jan. 22, 2008 ref. EP47679 concerning appln No. 06112329.5-2202 including European Search Report dated Jan. 14, 2008.

(Continued)

*Primary Examiner*—Rochelle-Ann J Blackman
(74) *Attorney, Agent, or Firm*—Canon U.S.A., Inc. I.P. Division

(57) ABSTRACT

A focus detection apparatus includes an image sensor that applies photoelectric conversion to incident light and accumulates charge, a first output unit that outputs electric signals based on the charge accumulated in the image sensor through multiple channels, and a focus detection unit that detects a phase difference on the basis of the electric signals outputted from the plurality of channels.

10 Claims, 10 Drawing Sheets

FOREIGN PATENT DOCUMENTS

| | | |
|---|---|---|
| JP | 08-275042 | 10/1996 |
| JP | 08-275048 | 10/1996 |
| JP | 9-54242 | 2/1997 |
| JP | 10-213737 A | 8/1998 |
| JP | 2001-136437 | 5/2001 |
| JP | 2003-172869 A | 6/2003 |
| JP | 3550599 | 5/2004 |

OTHER PUBLICATIONS

Japanese Office Action dated Mar. 7, 2008, concerning the basic Japanese Application No. 2006-106627. No translation available.

Chinese Office Action dated Jun. 29, 2007 concerning corresponding Chinese Patent Application 2006100747195 and English text portion of the First Office Action.

* cited by examiner

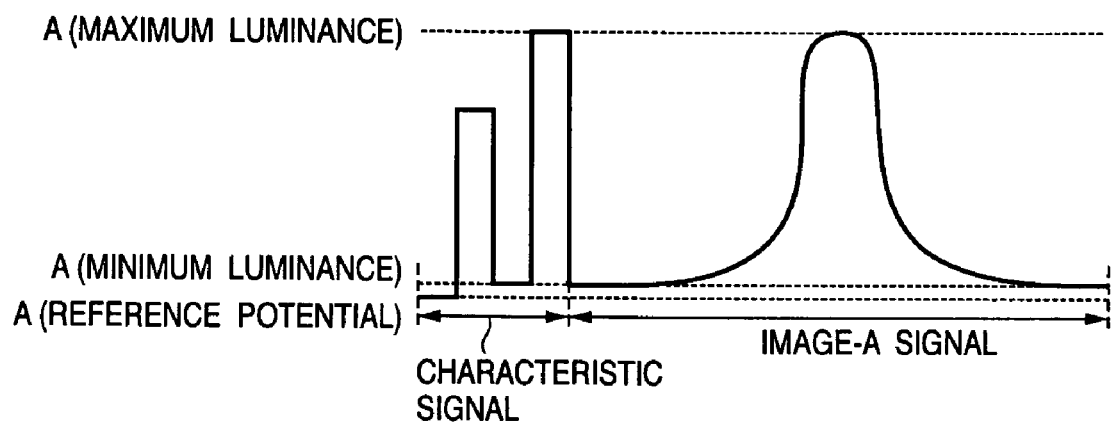
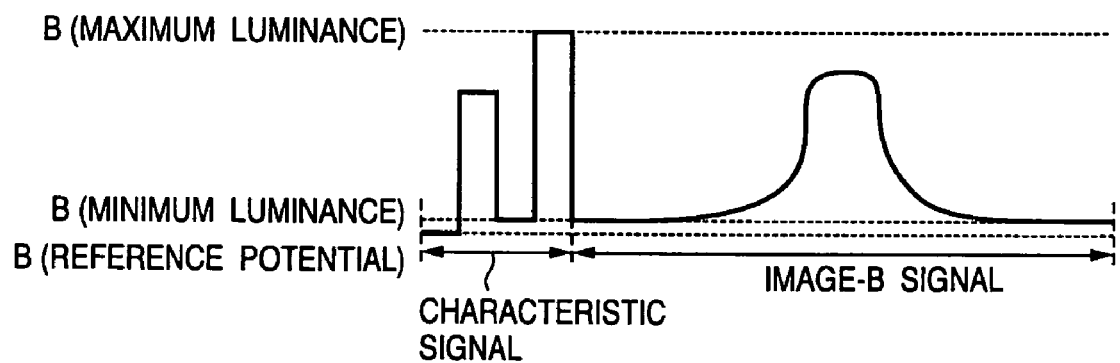

FOCUS DETECTION APPARATUS AND SIGNAL PROCESSING METHOD FOR FOCUS DETECTION

FIELD OF THE INVENTION

The present invention relates to a focus detection apparatus and a signal processing method for focus detection.

BACKGROUND OF THE INVENTION

As a conventional method for focus detection of cameras, the so-called phase-difference detection method is known. In the phase-difference detection method, images of light rays coming from a subject and passing through different exit pupils positions of the image sensing lens of a camera are formed on a pair of line sensors. The shift amount between the relative positions of subject images formed on the pair of line sensors is obtained to detect the defocus amount of the subject image and an image sensing lens is driven on the basis of the detected defocus amount (for example see Japanese Patent Laid-Open No. 09-054242).

Another known conventional focusing method is the so-called contrast detection method (or the hill-climbing detection method). In the contrast detection method, an image of a part of light rays coming from a subject through the image sensing lens of a camera is formed on an area sensor, the sharpness of the formed subject image is calculated, and a focusing lens is driven so that the highest sharpness is achieved (for example see Japanese Patent Laid-Open No. 2001-136437).

On the other hand, the semiconductor device manufacturing technology has been improving every year, and along with the improvement, the number of pixels of a line sensor or an area sensor used for focus detection (hereinafter referred to as a "focus detection sensor") has been increasing. Although the precision of focus detection increases with the increasing number of pixels, the time required for reading signals from a focus detection sensor also increases and so does the shutter release time lag. As a result, sometimes the shutter cannot be released at the best moment of the photographic subject. To address this problem, various methods have been proposed for speeding up focus detection without impairing the precision of focus detection (for example see Japanese Patent Laid-Open No. 63-148215 and No. 3550599).

According to Japanese Patent Laid-Open No. 63-148215, because not all image signals obtained from the pixels of a line sensor are required for focus detection in practice, A/D conversion, which is a time-consuming process, is not applied to the signals from pixels in the regions of a line sensor unnecessary for focus detection, thereby speeding up focus detection.

Japanese Patent No. 3550599 takes into consideration the fact that A/D conversion can be performed concurrently with processing performed in a micro processing unit (MPU). This is possible because A/D converters are peripheral circuits of an MPU, which performs processing such as correction processing required for focus detection by using image signals read from line sensors with an operation circuit such as an MPU. By causing the MPU to perform correction of a line sensor image, which is separate processing necessary for focus detection, while concurrently A/D conversion is being performed, the total time required for focus detection can be reduced.

However, in the method described in the Japanese Patent Laid-Open No. 63-148215, the position on line sensor where an image of a subject is formed varies depending on the amount of defocus and, in addition, the range of regions that must be read also varies depending on the characteristics of subjects. Accordingly, the number of pixels required for focus detection processing varies depending on situations. Although the method can reduce the time required for focus detection if the number of pixels required for the focus detection processing is small, it cannot reduce the time if a large number of pixels are required for the focus detection processing. Furthermore, the usability is impaired by the release time lag that varies depending on subjects due to variations in the time required for reading pixels.

The method described in the Japanese Patent No. 3550599 cannot sufficiently reduce the time required for focus detection because processes that can be executed in parallel with A/D conversion are few.

SUMMARY OF THE INVENTION

The present invention has been made in consideration of the above situation, and has as its first object to reliably and sufficiently reduce the time required for focus detection.

A second object of the present invention is to prevent the precision of focus detection from decreasing with a reduction in the time required for focus detection.

According to the present invention, the foregoing object is attained by providing a focus detection apparatus comprising: an image sensor that applies photoelectric conversion to incident light and accumulates charge; a first output unit that outputs an electric signal based on the charge accumulated in the image sensor through a plurality of channels; and a focus detection unit that detects a phase difference on the basis of electric signals outputted from the plurality of channels.

According to the present invention, the foregoing object is also attained by providing a focus detection apparatus comprising: an area sensor that applies photoelectric conversion to incident light and accumulates charge; a first output unit that outputs electric signals based on the charge accumulated in the area sensor through a plurality of channels; a combining unit that combines electronic signals outputted from the plurality of channels into a single image; and a focus detection unit that detects a focus state on the basis of the image combined by the combining unit, by using a contrast detection method.

Furthermore, the foregoing object is also attained by providing a signal processing method for focus detection in a focus detection apparatus including an image sensor that applies photoelectric conversion to incident light and accumulates charge and an output unit that outputs electric signals based on the charge accumulated in the image sensor through a plurality of channels, the method comprising: an output step of outputting common information into each of the plurality of channels; a correction step of correcting electronic signals obtained from the output unit on the basis of the common information; and a focus detection step of detecting a phase difference on the basis of the corrected electric signals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 7A and 7B show an example of a pair of signals before normalization, acquired by a camera MPU according to the embodiment of the present invention;

DETAILED DESCRIPTION OF THE PREFERRED EMBODIMENTS

A preferred embodiment of the present invention will be described in detail in accordance with the accompanying drawings. However, the dimensions, shapes and relative positions of the constituent parts shown in the embodiments should be changed as convenient depending on various conditions and on the structure of the apparatus adapted to the invention, and the invention is not limited to the embodiments described herein.

Figure 1:
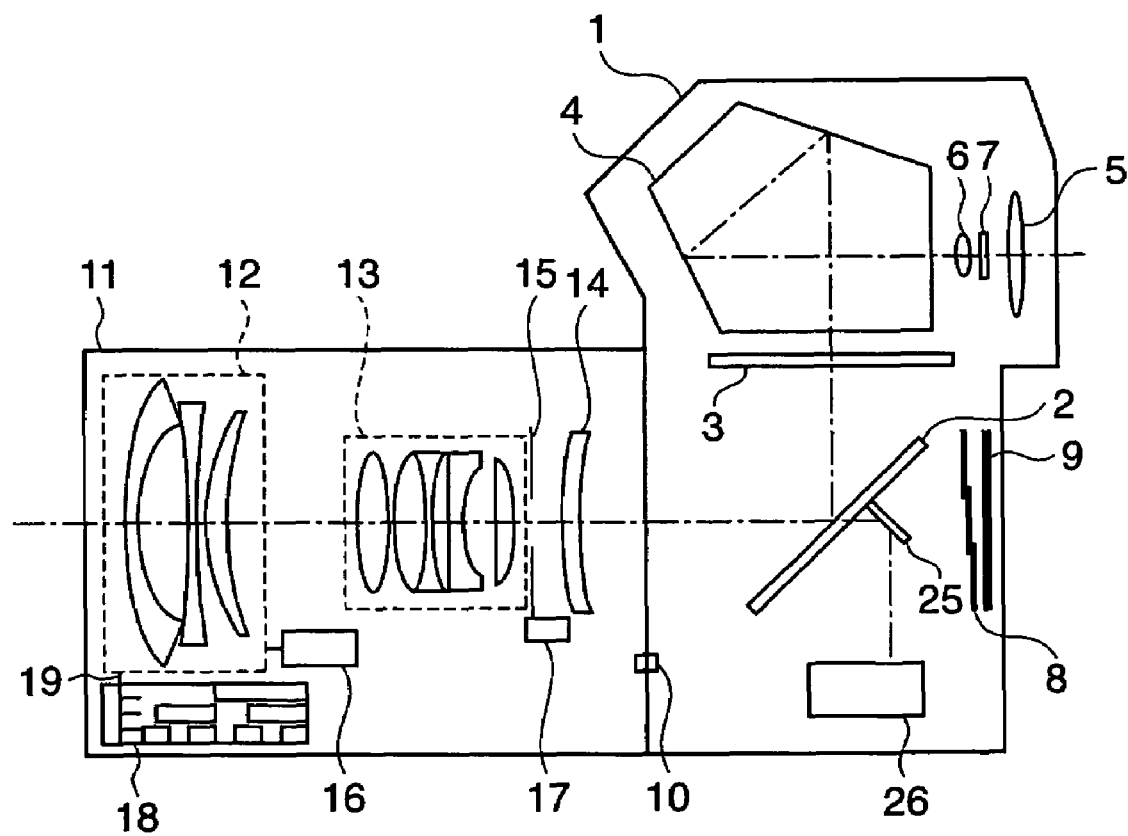
FIG. 1 schematically shows a configuration of a camera system including a single-lens reflex camera and an interchangeable lens attached to the camera according to an embodiment of the present invention.

FIG. 1 is a diagram schematically illustrating the structure of an autofocusing camera system comprising a single-lens reflex camera and an interchangeable lens mounted on the camera in a preferred embodiment of the present invention. FIG. 1 primarily illustrates the optical arrangement of the components.

The camera has a camera body 1 in the front end of which a lens unit 11 is mounted. The camera body 1 houses optical components, mechanical components, electrical circuitry and a film or an image sensing device such as a CCD, and the camera is capable of taking a picture using film or capturing an image by a photoelectric converter. A main mirror 2 is placed at an incline in the optical path of photography when the photographer observes the subject through a finder, and is withdrawn from this optical path when a photo is taken. The main mirror 2 is a half-mirror. When the main mirror 2 is placed at an incline in the optical path of photography, approximately half the light from the subject to an focus-state detection unit 26 (described later) is transmitted through the mirror 2.

The focus-state detection unit 26 detects a focus state by so-called phase difference detection method in this embodiment, and sends the detected result to an autofocusing control device which controls the focusing control mechanism of the lens unit 11. The focus-state detection unit 26 will be described in detail later.

A focusing screen 3 is placed in a planned image forming plane of lenses 12 to 14, described later, and a pentagonal prism 4 is provided for changing the optical path of the finder. An eyepiece 5 provides a window through which the photographer observes the focusing screen 3, thereby allowing the photographer to check the picture to be taken. A image forming lens 6 and a photometer 7 are for measuring the luminance of the subject in the observing screen of the finder.

Reference numeral 8 denotes a focal-plane shutter, and reference numeral 9 denotes a photosensitive member that employs a silver-halide emulsion film or an image sensing device such as a CCD or CMOS sensor. A sub-mirror 25 is placed at an incline in the optical path of photography together with the main mirror 2 when the photographer observes the subject through the finder, and is withdrawn from this optical path when a photo is taken. The sub-mirror 25 bends downward the light beam that has passed through the inclined main mirror 2 and guides the light beam toward the focus-state detection unit 26.

A mount contact group 10 serves as a communication interface between the camera body 1 and the lens unit 11.

A first lens group 12 (referred to as a "focusing lens" below) is moved back and forth along the optical axis to adjust the focus position of the image-sensing screen, and a second lens group 13 is moved back and forth along the optical axis to change the focal length of the lens unit 11 and scale the image-sensing screen. A third lens group 14 is fixed. Reference numerals 15 and 16 denote an iris diaphragm and a driving motor, respectively. The driving motor 16 is a focus driving motor for moving the focusing lens 12 back and forth along the optical axis when the autofocusing operation is performed. An aperture driving motor 17 changes the aperture diameter of the iris diaphragm 15. Owing to the sliding of a brush 19 attached to the first lens group 12, a distance encoder 18 reads the position of the focusing lens 12 and generates a signal that corresponds to the distance to the subject. More specifically, the distance encoder 18, brush 19 and a lens microprocessor (MPU) 112 (described later) read the position of the focusing lens 12 after focus has been adjusted and outputting a signal (subject-distance information) in which this position has been converted to subject distance prevailing at this time.

Figure 2:
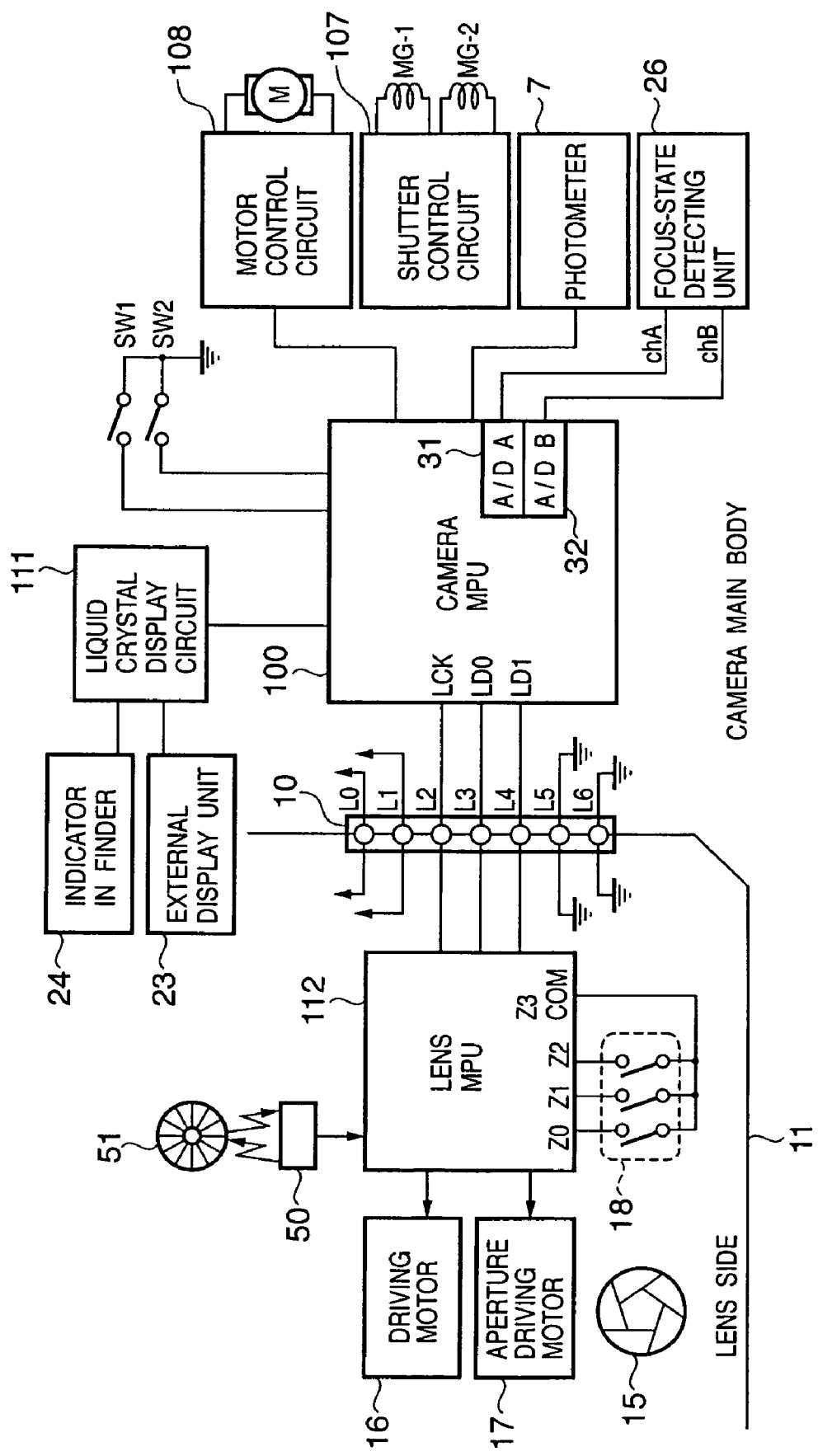
FIG. 2 is a block diagram showing a circuitry of the camera system according to the embodiment of the present invention.

The circuitry of this camera system will now be described with reference to FIG. 2. Components identical with those in FIG. 1 are designated by like reference characters.

The circuitry in the camera body 1 will be described first.

Connected to a camera microprocessor (MPU) 100 are the photometer 7, a focus-state detecting unit 26, a shutter control circuit 107, a motor control circuit 108 and a liquid crystal display circuit 111. The camera MPU 100 sends signals to the lens MPU 112, which is disposed inside the lens unit 11, via the mount contacts 10.

The focus-state detecting unit 26 outputs information for focus detection, described later, to the camera MPU 100 via the two channels (ChA, ChB). The camera MPU 100 incorporates A/D converters A31 and B32 corresponding to the respective channels (ChA and ChB), where information obtained from the focus-state detecting unit 26 is A/D converted, and detects the focus state by the phase-difference detection method. Then, the camera MPU 100 exchanges signals with the lens microprocessor 112 to thereby control the focusing of the focusing lens 12.

In accordance with a signal from the camera MPU 100, the shutter control circuit 107 controls the excitation of a frontcurtain driving magnet MG-1 and of a rear-curtain driving magnet MG-2 that construct the focal-plane shutter 8, thereby driving the front and rear curtains of the shutter to perform an exposure operation. The motor control circuit 108 controls a motor M in accordance with a signal from the camera microprocessor 100, thereby moving the main mirror 2 and sub-mirror 25 up and down and performing shutter charge, etc.

A switch SW1 is a switch that is turned ON by a first stroke (half-depression) of a release button (not shown) to start image-sensing preparations such as photometry and autofocusing. A switch SW2 is a switch that is turned on by a second stroke (full-depression) of the release button to drive the shutter, i.e., to start the exposure operation. Switch-status signals from the switches SW1 and SW2 and from switches such as an ISO sensitivity setting switch, aperture setting switch and shutter-speed setting switch are read by the camera microprocessor 100.

The liquid crystal display circuit 111 controls an indicator 24 within the finder and an external display unit 23 in accordance with signals from the camera MPU 100.

Other than above, output from a dial switch (not shown) for switching various camera settings (shutter speed, aperture value, image sensing mode, etc.) is also inputted to the camera MPU 100.

The electrical circuitry within the lens unit 11 will be described next.

As mentioned above, the camera body 1 and lens unit 11 are electrically interconnected via the lens-mount contacts 10. The lens-mount contacts 10 include a contact L0, which is a power-supply contact of the focus driving motor 16 and aperture driving motor 17 within the lens unit 11; a power-supply contact L1 for the lens MPU 112; a clock contact L2 for communicating serial data; a contact L3 for transmitting data from the camera body 1 to the lens unit 11; a contact L4 for transmitting data from the lens unit 11 to the camera body 1; a contact L5 for grounding the motors with respect to the motor power supply; and a contact L6 for grounding with respect to the power supply for the lens MPU 112.

The lens MPU 112 is connected to the camera MPU 100 via the lens-mount contacts 10, operates the focus driving motor 16 for driving the focusing lens 12 and the aperture driving motor 17 for driving the iris diaphragm 15 in accordance with signals from the camera MPU 100, and controls focusing and aperture of the lens unit 11. Numerals 50 and 51 denote a light detector and pulse plate, respectively. The lens MPU 112 counts the number of pulses produced by the light detector 50 and pulse plate 51 to thereby obtain information concerning the position of the focusing lens 12 at the time of focal adjustment (focusing). As a result, focus control of the lens unit 11 is performed.

The distance encoder 18 reads the position information of the focusing lens 12 and inputs this position information to the lens MPU 112, which proceeds to convert this information to subject-distance information and transmit the distance information to the camera MPU 100.

Figure 3:
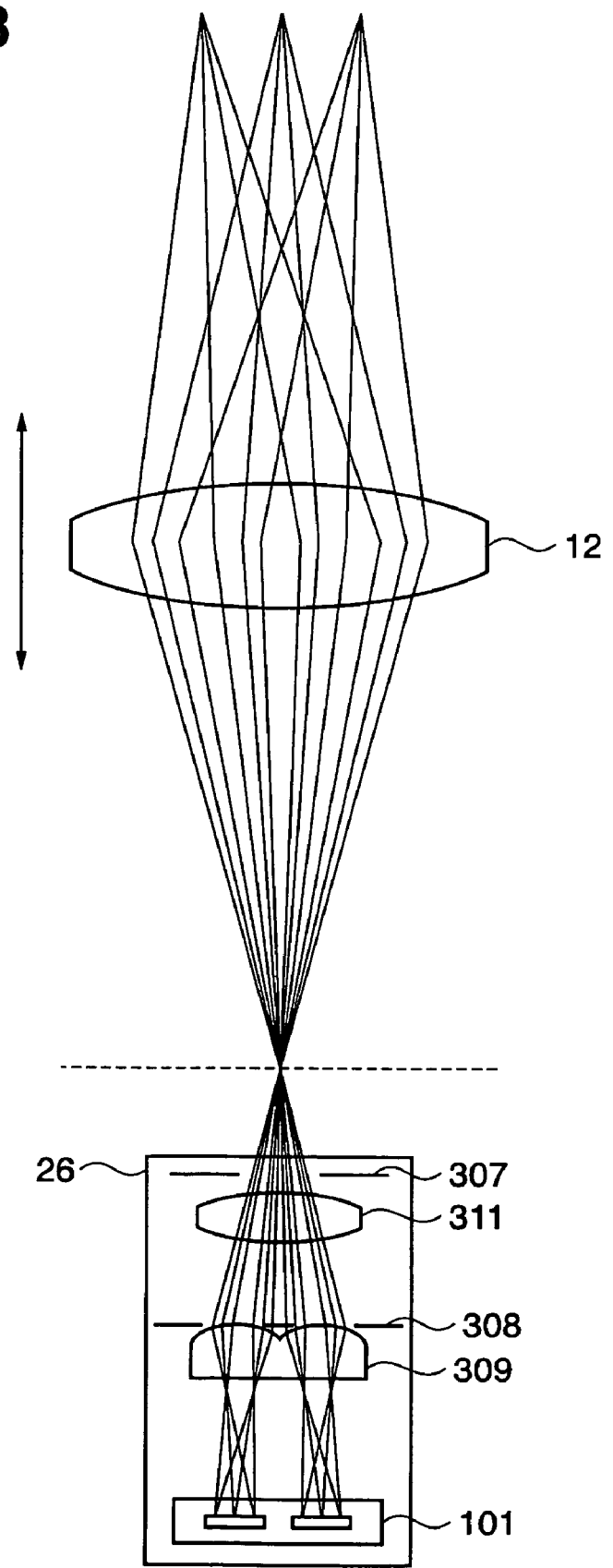
FIG. 3 is a diagram illustrating a configuration of a focus detection unit and the optical positional relation between the focus detection unit and a focusing lens according to the embodiment of the present invention.

Next, a configuration of the focus-state detection unit 26 and the optical positional relation between the focus-state detection unit 26 and the focusing lens 12 will be described below with reference to FIG. 3. In FIG. 3, one lens conceptually represents the first lens group (focusing lens) 12.

The focus-state detection unit 26 includes a field mask 307, a field lens 311, an aperture diaphragm 308, a secondary image forming lens 309, and an autofocus (AF) sensor 101.

Light rays coming from a subject and passing through the focusing lens 12 are reflected by the sub-mirror 25 shown in FIG. 1 and an image of the light rays is formed near the field mask 307 which is in a conjugate plane of the imaging plane. The light path, which is actually reflected back by the sub-mirror 306, is shown developed. The field mask 307 blocks unnecessary light other than the distance measurement points (focus detection area) in the screen.

The field lens 311 has the function of forming an image of each aperture of the aperture diaphragm 308 on a position near an exit pupil of the lens unit 11. A secondary image forming lens 309 is positioned behind the aperture diaphragm 308. The secondary image forming lens 309 consists of a pair of lenses, each of which corresponds to an aperture of the aperture diaphragm 308. An image of each light ray passing through the field mask 307, field lens 311, aperture diaphragm 308, and secondary image forming lens 309 is formed on a pair of line sensors (sensor arrays) in the AF sensor 101. According to the present embodiment, AF sensor 101 has one or more line sensors, formed on one substrate, capable of detecting at least a pair of images. And an in-focus state is detected on the basis of two images having parallax obtained from the line sensor pair by using a well-known phase-difference detection method.

An overview of the phase-difference detection method will be briefly described below. Image signal values obtained from one of the line sensor pair are first shifted by a given amount with respect to the pixel positions of the image signal values obtained from the other line sensor pair and the sum of the absolute values of the differences between image signal values of corresponding pixels of the line sensor pair is obtained. This procedure is repeated and a defocus amount is obtained based on the amount of shift that results in the smallest sum.

The following is a detailed description of a configuration and operation of the AF sensor 101 of the focus-state detection unit 26 and process performed by the camera MPU 100 for focus control according to the present embodiment.

Figure 4:
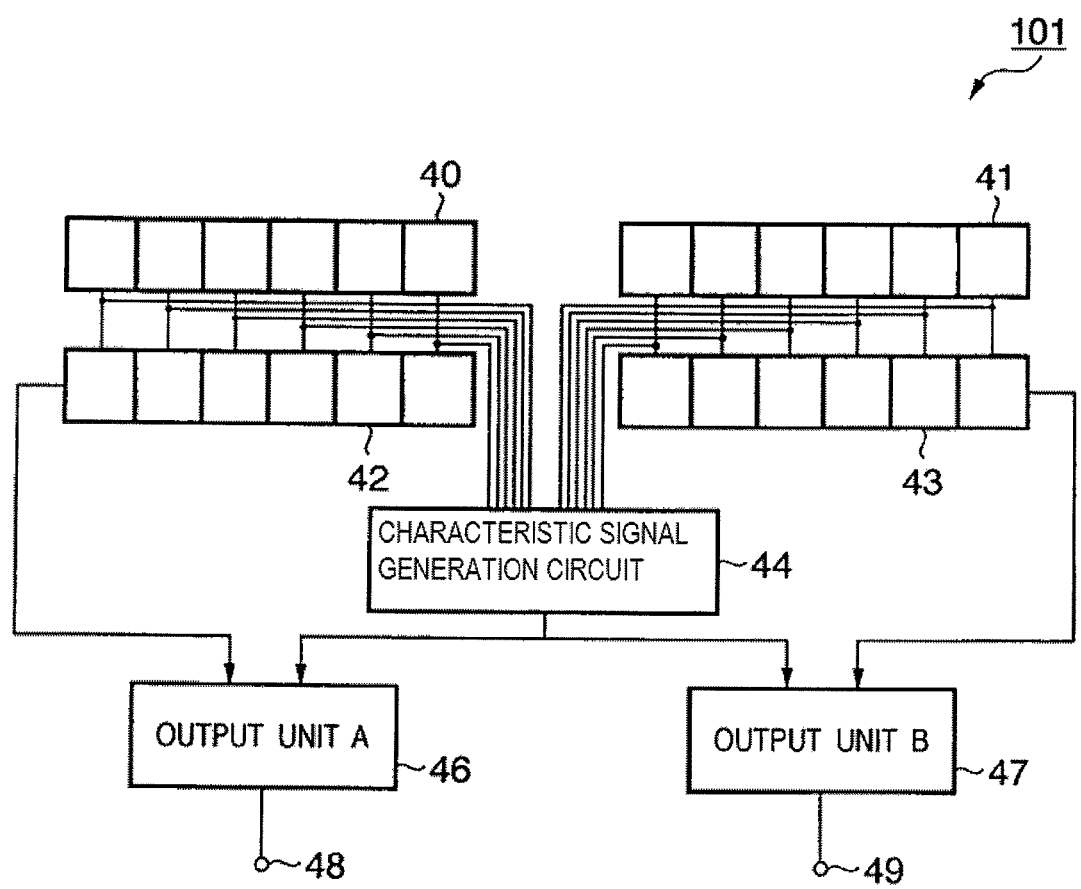
FIG. 4 is a block diagram schematically showing a functional configuration of an AF sensor according to the embodiment of the present invention.

FIG. 4 is a block diagram schematically showing a functional configuration of the AF sensor 101. As described above, the AF sensor 101 has a pair of image sensors 40 and 41 which receive light rays passing thorough the secondary image forming lens 309 and accumulates charge according to the amount of light received, and transfer units 42 and 43 which transfer the charge accumulated in the image sensors 40 and 41. The AF sensor 101 further includes a characteristic signal generation circuit 44 which generates characteristic signals based on outputs from the image sensors 40 and 41, which will be described later. The AF sensor 101 further includes output units A46 and B47 which generate output signals based on outputs from the image sensors 40 and 41 transferred from the transfer units 42 and 43 and a characteristic signal outputted from the characteristic signal generation circuit 44. The AF sensor 101 also includes output terminals A48 and B49 through which signals outputted from the output units A46 and B47 are outputted to the camera MPU 100. Each of the output units A46 and B47 has an amplifier for amplifying a charge signal.

It should be noted that a line sensor capable of sensing a pair of images may be formed on a substrate of the AF sensor. Namely, the image sensors 40 and 41 do not have to be individual, and so as the transfer units 42 and 43.

Thus, the AF sensor 101 in the present embodiment has multiple output systems, each of which associated with the image sensors 40 and 41. Therefore, charges from the image sensors 40 and 41 can be concurrently outputted. Accordingly, charges accumulated in the image sensors 40 and 41 can be outputted faster than they would be outputted from a single output system as in a conventional AF sensor. Charges read through the two output systems are converted by the A/D converters A31 and B32 associated with the output systems in the camera MPU 100. Thus, the in-focus state can be quickly detected.

Ideally, image signal values of the images obtained through the two output systems and A/D converters A31 and B32 should match each other. However, it is practically difficult to cause the two sets of output systems and A/D converters to completely match each other. Therefore, in practice, different gains are applied to or different offsets are added to them by using amplifiers. Thus, the signal values of the two images A/D-converted by the A/D converters A31 and B32 have different signal values according to the characteristics of the output systems. If such signal values are used in focus state detection using the phase-difference detection method, a large total difference between the two image signal values will result even in an in-focus state and the focus state may not be able to be correctly be detected. Therefore, the signals outputted from the multiple output systems must be corrected by taking the gains and offsets into account.

A correction process according to the present embodiment will be described below.

Figure 5:
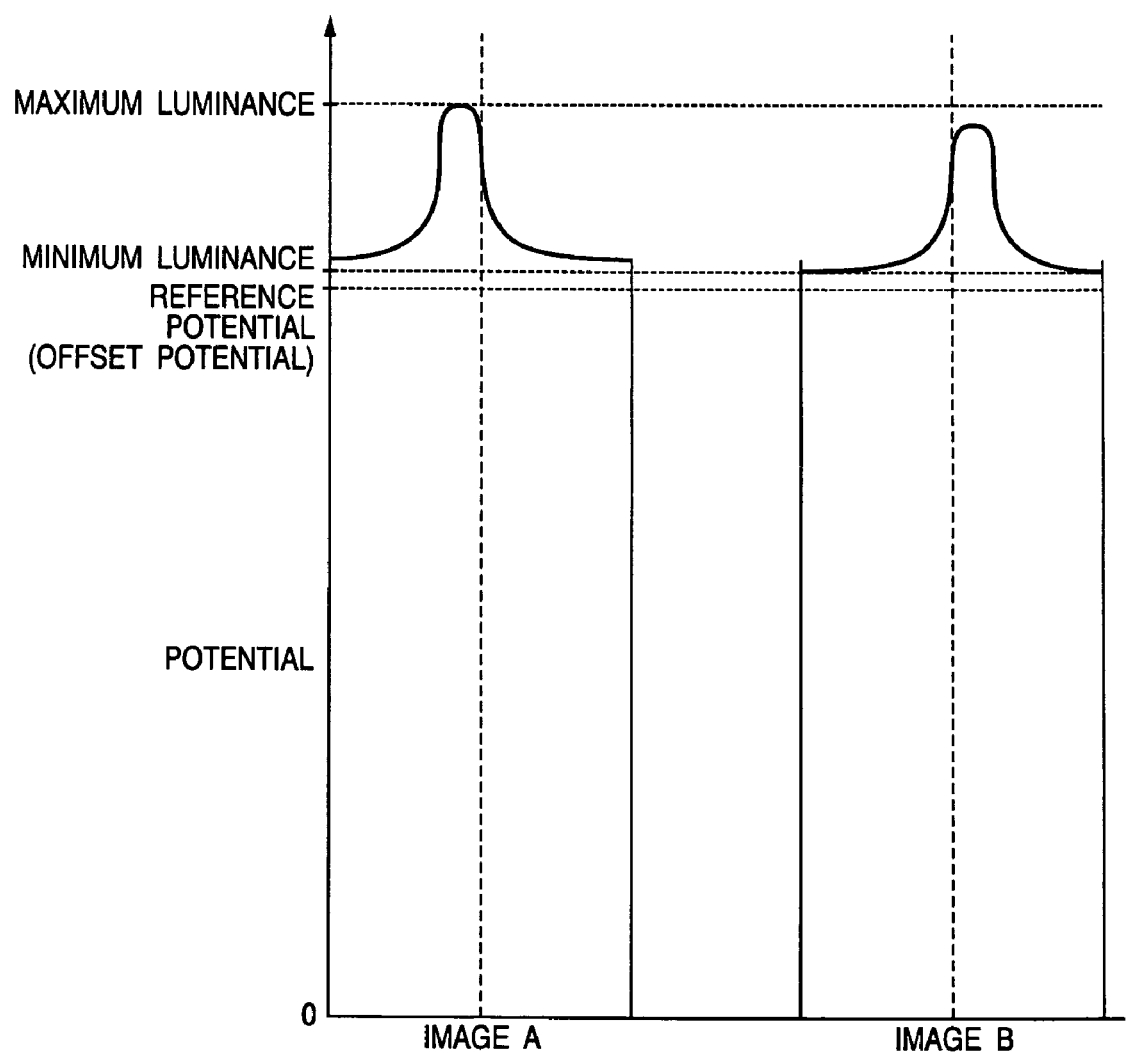
FIG. 5 shows an example of a signal outputted from a pair of image sensors according to the embodiment of the present invention.

The characteristic signal generation circuit 44 of this embodiment receives signals outputted from the image sensors 40 and 41. FIG. 5 shows the signals outputted from image sensors 40 and 41 at this point in time. In the following description, an image outputted from the image sensor 40 is referred to as Image A and an image outputted from the image sensor 41 is referred to as Image B.

The characteristic signal generation circuit 44 detects the maximum luminance and minimum luminance that Images A and B acquired have in common. Based on the maximum and minimum luminance detected, a reference potential signal, maximum and minimum luminance signals, and offset signal are generated as characteristic signals. As shown in FIG. 5, a potential slightly lower than the minimum luminance is set as the reference potential and a potential equal to 1/10 of the reference potential is set as the offset signal. This is because the reference potential signal is significantly greater than the potential difference between the maximum luminance and minimum luminance. Off course, the offset signal is not limited to 1/10 of the reference potential. It may be 1/4 or 1/2 or any appropriate fraction of the reference potential. The reference potential signal should represent 0 V after the offset signal is subtracted, the maximum luminance signal should represent the potential difference between the maximum luminance and the reference potential, and the minimum luminance signal should represent the potential difference between the minimum luminance and the reference potential. Thus, the relation among the reference potential signal, maximum luminance signal, minimum luminance signal and offset signal, and the maximum luminance and minimum luminance, thus produced, satisfies the following equations:

Maximum luminance=maximum luminance signal+ offset signal×10−reference potential signal Minimum luminance=minimum luminance signal+ offset signal×10−reference potential signal The characteristic signals consisting of the reference potential signal, maximum luminance signal, minimum luminance signal, and offset signal thus generated are outputted to each of the output units A46 and B47.

Figure 6:
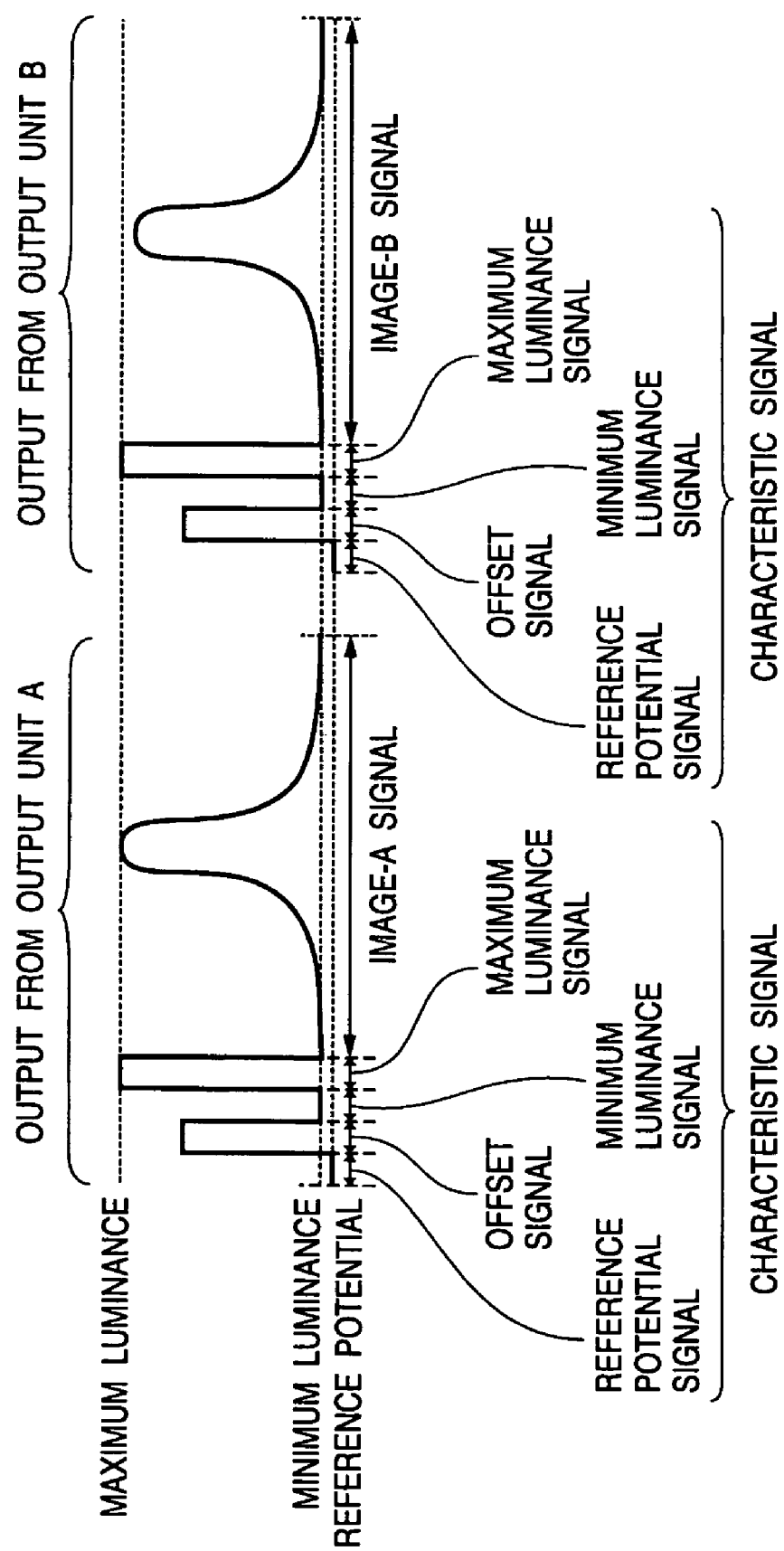
FIG. 6 shows an example of a signal outputted from a pair of output terminals according to the embodiment of the present invention.

The output units A46 and B47 first outputs the reference potential signal, maximum luminance signals, minimum luminance signals, and offset signals to their respective output terminals A48 and B49. The output units A46 and B47 then subtract the offset signal multiplied by 10 from signals shown in FIG. 5 obtained from the image sensors 40 and 41 and output the resulting signals. FIG. 6 is a conceptual diagram showing the signals outputted from the output terminals A48 and B49.

The signals outputted from the output units A46 and B47 are input into the camera MPU 100 through different output amplifiers and are then converted into digital signals by the different A/D converters A31 and B32. In the path to the conversion into the digital signals in the camera MPU 100, different gains "a" and "c" and different offset levels "b" and "d" are applied to the signals. In particular, if a potential "i" passing through channels ChA and ChB associated with the units A46 and B47, respectively, is converted into digital signals by the A/D converters A31 and B32 of the camera MPU 100, the signals A (i) and B (i) obtained in the camera MPU can be expressed as:

$$A(i)=a \times i+b \quad (1)$$

$$B(i)=c \times i+d \quad (2)$$

Therefore, the reference potential signals input through the channels ChA and ChB are $$A(\text{reference potential signal})=a \times \text{reference potential signal}+b \quad (3)$$

$$B(\text{reference potential signal})=c \times \text{reference potential signal}+d \quad (4)$$

The minimum luminance signals are $$A(\text{minimum luminance signal})=a \times \text{minimum luminance signal}+b \quad (5)$$

$$B(\text{minimum luminance signal})=c \times \text{minimum luminance signal}+d \quad (6)$$

The offset signals are $$A(\text{offset signal})=a \times \text{offset signal}+b \quad (7)$$

$$B(\text{offset signal})=c \times \text{offset signal}+d \quad (8)$$

The maximum luminance signals are $$A(\text{maximum luminance signal})=a \times \text{maximum luminance signal}+b \quad (9)$$

$$B(\text{maximum luminance signal})=c \times \text{maximum luminance signal}+d \quad (10)$$

FIG. 7A shows an example of a signal generated by applying A/D conversion by the A/D converter A31 of the camera MPU 100 to a signal input through cannel ChA. FIG. 7B shows an example of a signal generated by applying A/D conversion by the A/D converter B32 to a signal input through channel ChB.

From Equations (3), (4), (9), and (10), $$c/a=(B(\text{maximum luminance signal})-B(\text{reference potential signal}))/(A(\text{maximum luminance signal})-A(\text{reference potential signal})) \quad (11)$$

Therefore, the ratio of "a" to "c" can be obtained from signals A (i) and B (i) obtained in the camera MPU 100. It will be appreciated that the ratio of "a" to "c" can also be obtained Equations (3), (4), (7), and (8) or equations (3), (4), (5), and (6).

By representing the right-hand side of Equation (11) as D to rewrite Equation (11) as c/a=D, substituting this into Equa tions (3) and (4), and solving these equations for "d", the following relation between "b" and "d" is yield.

$$d=B(\text{reference potential signal})+b\times D-A(\text{reference potential signal})\times D \quad (12)$$

From Equation (12), Equations (1) and (2) can be rewritten as $$A(i)=a\times i+b \quad (13)$$

$$B(i)=(a\times i+b)\times D+B(\text{reference potential signal})-A(\text{reference potential signal})\times D \quad (14)$$

From Equation (14), $$(B(i)-B(\text{reference potential signal})+A(\text{reference potential signal})\times D)/D=(a\times i+b)$$

Therefore $$B'(i)=(B(i)-B(\text{reference potential signal})+A(\text{reference potential signal})\times D)/D \quad (15).$$

Figure 8A:
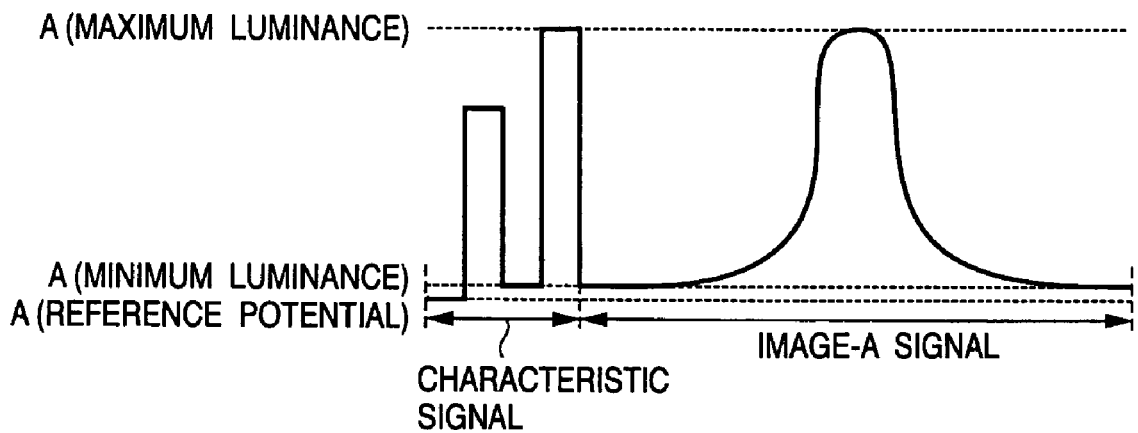
FIGS. 8A and 8B show an example of a pair of signals after normalization according to the embodiment of the present invention.
Figure 8B:
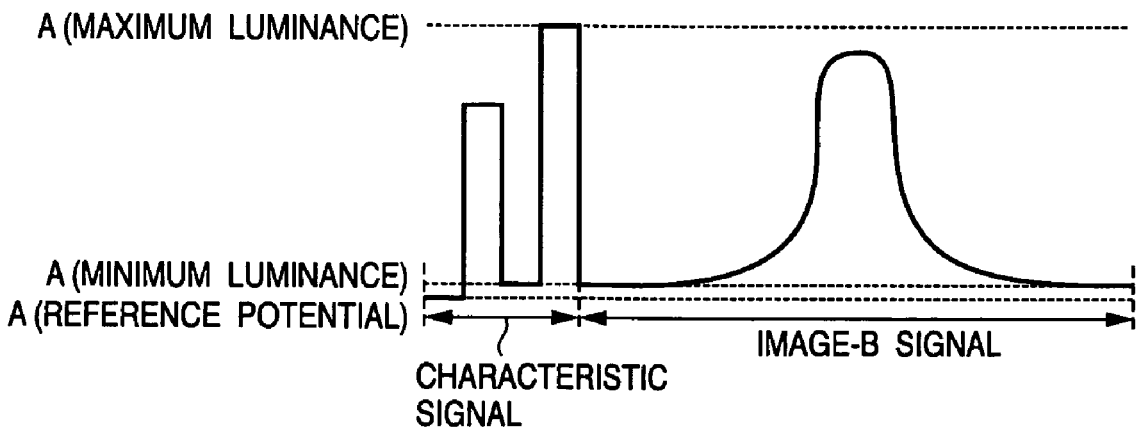

In this way, Equation (15) is calculated for signal B (i) of channel B by using A (reference potential signal), B (reference potential signal), A (maximum luminance signal), and B (maximum luminance signal), obtained in the camera MPU 100, to which gains and offsets that differ between channels are applied. Thus, the value of B' (i), which is a value normalized with respect to the signal obtained through cannel A, can be obtained. FIG. 8A shows an example of a signal obtained in the camera MPU 100 through cannel A and FIG. 8B shows an example of a signal obtained by normalizing the signal obtained through channel B.

The correlation of a signal change is the same for the correlation of a signal change in which a signal undergoes linear transformation as in Equation (15). Therefore, by performing the above correction, a focus detection amount of the line sensor image can be obtained as an identical focus detection amount in the camera MPU 100. That is, the focus detection amount of a line sensor image detected in the focus-state detection unit 26 is identical to the focus detection amount in the camera MPU 100. This is because the signal change within the focus-state detection unit 26 is similar to the signal change converted by the equation (15) within the camera MPU 100. In other words, it does not have to precisely reproduce the signal change within the camera MPU 100 from the signal change within the focus-state detection unit 26, and as long as the signal change within the focus-state detection unit 26 and the signal change within the camera MPU 100 are similar to each other, the signal change within the focus-state detection unit 26 can bear the focus detection.

Then, the offset signal multiplied by 10 is added to each of the signals of Images B and A normalized as described above to restore the original signal value, thereby reproducing Images A and B. Based on the signals of the reproduced Images A and B, an in-focus state is detected by using the phase-difference detection method. In this way, the signals of the two images are outputted through the two output systems and the image signal of Image B is normalized with respect to the signal of Image A as described above before detection of focus state. Thus, focus detection can be accomplished faster without impairing the precision of the focus detection.

The relation between "b" and "d" has been obtained from two sets of reference potential signals and maximum luminance signals by solving simultaneous equations in the example described above. However, given that the reference potential signals are sufficiently small, Equations (3) and (4) can be approximately written as $$A(\text{reference potential signal})\approx b \quad (16)$$

$$B(\text{reference potential signal})\approx d \quad (17)$$

That is, the difference in offset level between the different terminals can be corrected by using only one set of signals.

Furthermore, given that the reference potential signals are sufficiently small, Equations (9) and (10) can be approximately written as $$A(\text{maximum luminance signal})\approx a\times \text{maximum luminance signal} \quad (18)$$

$$B(\text{maximum luminance signal})\approx c\times \text{maximum luminance signal} \quad (19)$$

$$c/a\approx B(\text{maximum luminance signal})/A(\text{maximum luminance signal}) \quad (20).$$

Thus, the ratio "a" to "c" can be obtained and the difference in gain between the difference terminals can be corrected by using only one set of signals.

Taking errors in A/D conversion into account, a combination of three or more sets of reference potential, maximum luminance, minimum luminance, and offset signals may be used to obtain the relation among "a", "b", "c", and "d" through use of a statistical method such as the least-squares method. Furthermore, the number of characteristic signals may be reduced by considering reference potential signal=minimum luminance signal (Modification)

In the example described above, the output from the image sensor 40, which applies photoelectric conversion to Image A, is sent through the transfer unit 42 to the output unit A46 to the camera MPU 100, and the output from the image sensor 41, which applies photoelectric conversion to Image B, is sent through the transfer unit 43 to the output unit 47 to the camera MPU 100. However, the way the image sensors 40 and 41 output signals is not so limited.

Figure 9:
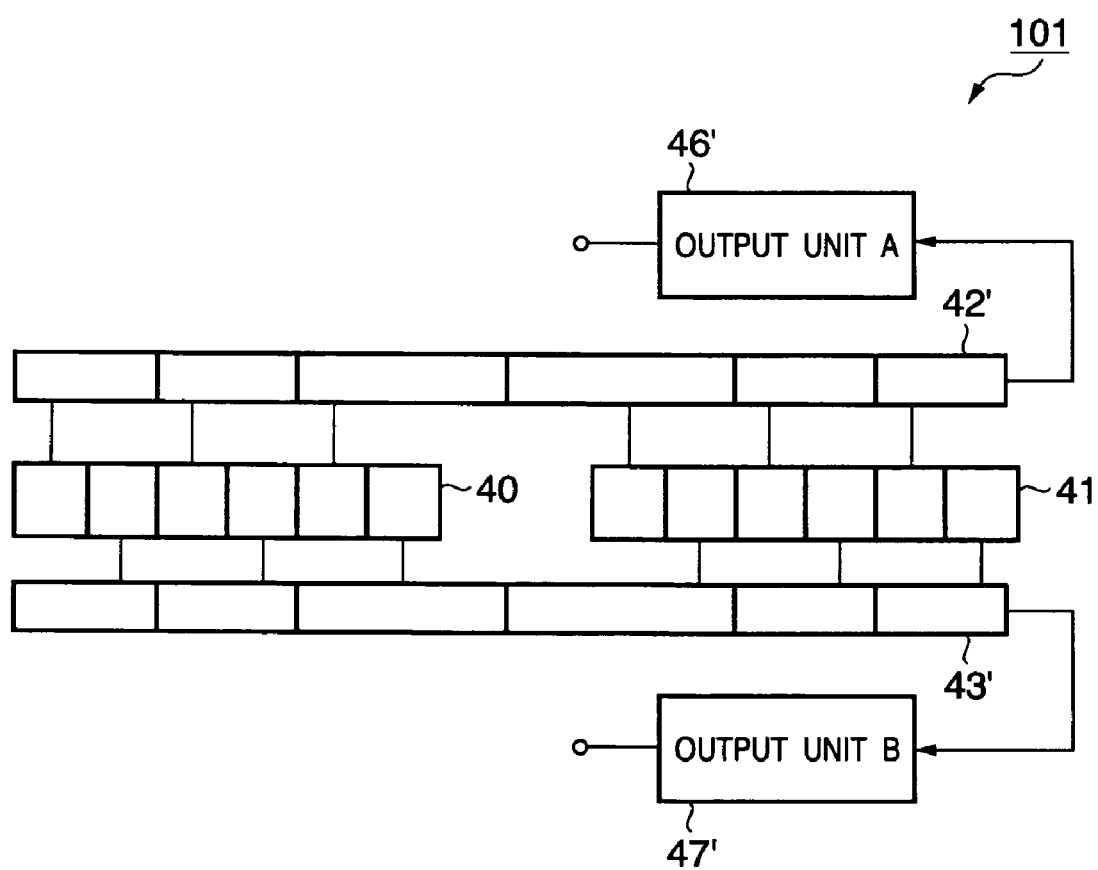
FIG. 9 is a block diagram showing a configuration of a photoelectric conversion unit according to a variation of the embodiment of the present invention.

For example, the outputs may be transferred as shown in FIG. 9. In particular, charge signals from the odd-numbered pixels of the image sensors 40 and 41 may be sent to the transfer unit 42' to the output unit A46' to the camera MPU 100, and charge signals from the even-numbered pixels of the image sensors 40 and 41 may be sent to the transfer unit 43' to the output unit B47' to the camera MPU 100.

Figure 10:
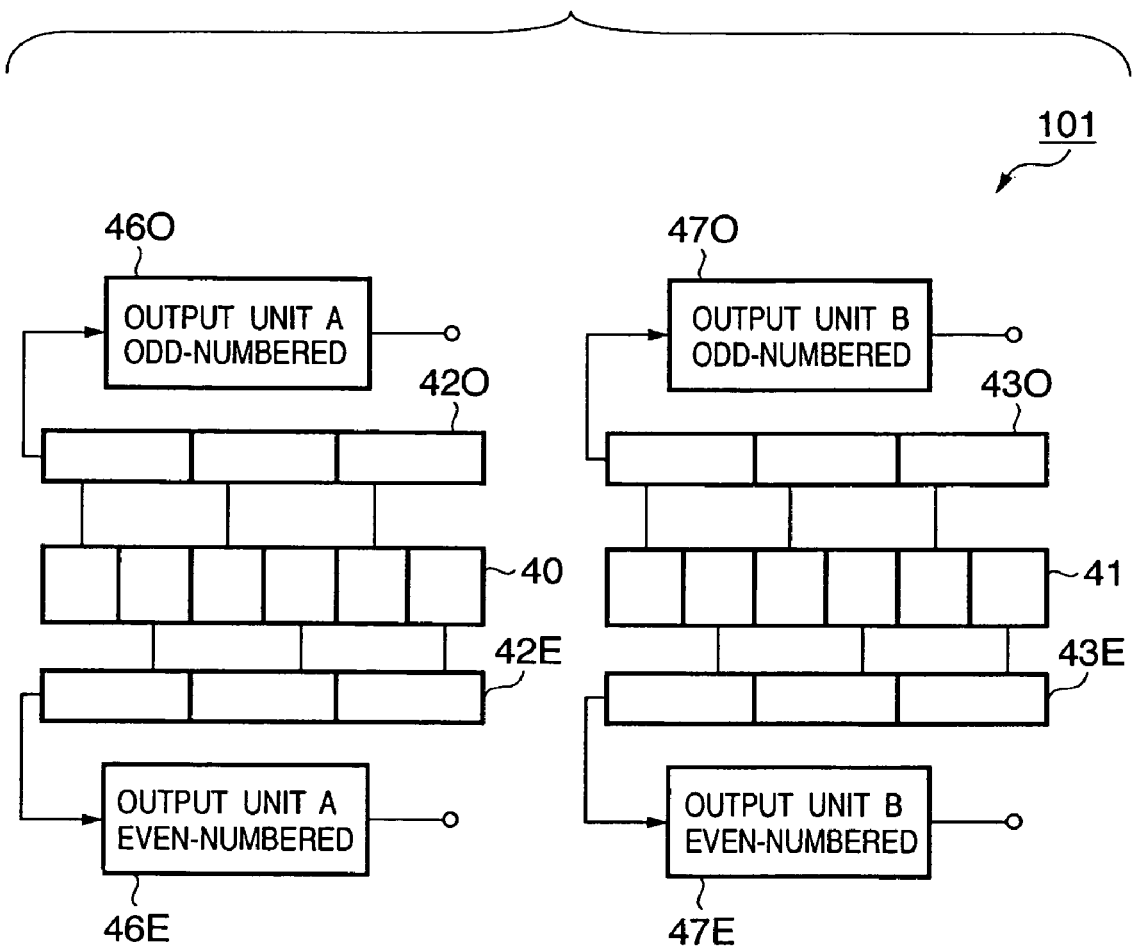
FIG. 10 is a block diagram showing another configuration of the photoelectric conversion unit according to the variation of the embodiment of the present invention.

The number of output channels is not limited to two; signals may be outputted through three or more channels as shown in FIG. 10. In FIG. 10, reference numerals 40 and 41 denote image sensors, reference numerals 420, 42E, 430, and 43E denote transfer units, and reference numerals 460, 46E, 470, and 47E denote output units associated with the respective output units.

Furthermore, an image sensor may be implemented by a single line sensor. In this case, signals from the pixels in the photo reception region for Image A may be outputted through the transfer unit 46 and signals from the pixels in the photo reception region for Image B may be outputted through the transfer unit 47.

Moreover, two input channel may be provided for one A/D converter. In this case, charge accumulation and potential comparison are performed as two steps of an internal processing of the A/D converter. Then, the two steps, i.e., charge accumulation and potential comparison are controlled to operate individually. By doing so, signals input through the two input channels alternatively undergo the charge accumulation and potential comparison in parallel. More specifically, in this case, while charge accumulation is performed for signals from one of the channels, the potential comparison is performed for signals from the other channel. This parallel processing is called pipeline processing. With the pipeline processing, one A/D converter can apparently operate as two A/D converters, and this kind of A/D converter can be used in the present invention.

While focus detection processing using phase-difference detection method has been described in the above embodiments, the present invention is not limited to the phase-difference detection method. The present invention is also applicable to other focus detection methods such as the so-called contrast detection method (or the hill-climbing method) as well. In the case of the contrast detection method, the AF sensor 101 is implemented by, instead of a pair of line sensors, an area sensor of a size capable of accepting light of an image in a focus detection region in one frame area. Charges in the area sensor are read through a multiple channels and are normalized in the camera MPU 100 with respect to one of the channels. The normalized image signals are combined into one image, high-frequency components are detected from the image, and the integral of them is evaluated. This process is repeated as the focusing lens 12 is moved by a predetermined amount. In doing so, the point at which the maximum integral value is obtained (the point at which the maximum sharpness is obtained) is found. Thus, faster focus detection processing can be performed without impairing the precision of focus state detection.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-113957 filed on Apr. 11, 2005, which is hereby incorporated herein by reference herein in its entirety.

What is claimed is:

1. A focus detection apparatus comprising:
    an image sensor that applies photoelectric conversion to incident light and accumulates charge;
    a first output unit that outputs an electric signal based on the charge accumulated in said image sensor through a plurality of channels;
    a second output unit that outputs first information to the plurality of channels;
    a focus detection unit that detects a phase difference on the basis of electric signals outputted from the plurality of channels; and
    a plurality of A/D converters that respectively correspond to the plurality of channels,
    wherein said focus detection unit comprises a correction unit that corrects, on the basis of second information obtained by A/D converting the first information respectively by said plurality of A/D converters, A/D converted electric signals outputted from the plurality of channels and converted by said plurality of A/D converters and detects a phase difference by using the electric signals corrected by said correction unit.

2. The focus detection apparatus according to claim 1, wherein said second output unit detects a reference value from the charge accumulated in said the image sensor and outputs as the first information an offset signal representing an offset value based on the reference value and a reference signal representing the reference value.

3. The focus detection apparatus according to claim 2, wherein said second output unit detects the maximum value of the charge accumulated in said image sensor and further outputs the maximum value as the first information.

4. The focus detection apparatus according to claim 2, wherein said first output unit outputs an electric signal representing the difference obtained by subtracting the offset value from the charge accumulated in said image sensor.

5. The focus detection apparatus according to claim 1, wherein said second output unit detects the minimum value of the charge accumulated in said image sensor and further outputs, as the first information, an offset signal representing an offset value based on the minimum value of the charge and a signal representing a value in the range from a reference value of the charge accumulated in said image sensor to the minimum value.

6. The focus detection apparatus according to claim 1, further comprising image forming lenses that form on said image sensor a pair of optical images of a pair of light rays coming from a subject through different exit pupil positions of an image sensing lens; wherein said image sensor includes a plurality of predetermined regions corresponding to the plurality of channels, the plurality of predetermined regions corresponds to the pair of light rays, and said focus detection unit detects the phase difference by using a phase-difference detection method.

7. The focus detection apparatus according to claim 6, wherein the image sensor has a pair of line sensors which respectively correspond to the plurality of predetermined regions, and a pair of optical images are formed on said line sensors by said image forming lenses.

8. The focus detection apparatus according to claim 1, wherein said first output unit outputs electric signals through the plurality of channels concurrently with each other on the basis of the charge accumulated in said image sensor.

9. A focus detection apparatus comprising:
    an area sensor that applies photoelectric conversion to incident light and accumulates charge;
    an output unit that outputs electric signals based on the charge accumulated in said area sensor through a plurality of channels;
    a combining unit that combines electronic signals outputted from the plurality of channels into a single image; and
    a focus detection unit that detects a focus state on the basis of the image combined by said combining unit, by using a contrast detection method.

10. A signal processing method for focus detection in a focus detection apparatus including an image sensor that applies photoelectric conversion to incident light and accumulates charge and an output unit that outputs electric signals based on the charge accumulated in the image sensor through a plurality of channels, the method comprising:
    an output step of outputting first information into each of the plurality of channels;
    an A/D conversion step of A/D converting the electric signals and A/D converting the first information output from the plurality of channels into second information;
    a correction step of correcting the A/D convened electric signals on the basis of the second information; and
    a focus detection step of detecting a phase difference on the basis of the corrected electric signals.

* * * * *